(12) United States Patent
Margolin

(10) Patent No.: US 12,164,793 B1
(45) Date of Patent: Dec. 10, 2024

(54) PREMATURE INCOMING PACKET PROCESSING

(71) Applicant: Next Silicon Ltd, Givatayim (IL)

(72) Inventor: Alexander Margolin, Ashdod (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 18/426,508

(22) Filed: Jan. 30, 2024

(51) Int. Cl.
*G06F 3/06* (2006.01)

(52) U.S. Cl.
CPC ............ *G06F 3/064* (2013.01); *G06F 3/0604* (2013.01); *G06F 3/0673* (2013.01)

(58) Field of Classification Search
CPC ....... G06F 3/064; G06F 3/0604; G06F 3/0673
See application file for complete search history.

(56) References Cited

U.S. PATENT DOCUMENTS

2018/0181530 A1* 6/2018 Kantecki ............... G06F 13/126
2020/0089528 A1* 3/2020 Gutierrez ............. G06F 9/3877

OTHER PUBLICATIONS

Congdon et al. "Packet Prediction for Speculative Cut-Through Switching", ANCS'08, Proceedings of the 4th ACM/IEEE Symposium on Architectures for Networking and Communications Systems, San Jose, CA, USA, Nov. 6-7, 2008, p. 99-108, Nov. 6, 2008.
Kaufmann et al. "High Performance Packet Processing With FlexNIC", ASPLOS '16: Proceedings of the Twenty-First International Conference on Architectural Support for Programming Languages and Operating Systems, Atlanta, Georgia, USA, Apr. 2-6, 2016, p. 67-81, Mar. 25, 2016.

* cited by examiner

*Primary Examiner* — Gary W. Cygiel

(57) ABSTRACT

A method of processing incoming packets prior to complete reception, comprising receiving a pointer to one or more memory blocks allocated for storing one or more incoming packets to be written by one or more another controllers where each packet comprises one or more packet segments, determining all valid data values of fields contained in the packet segments. initializing one or more memory sections in the memory blocks which are mapped to the fields with predefined data pattern which are different from any of the valid values of the fields, checking continuously content of the memory sections, determining packet segment(s) were written in the memory block(s) responsive to detecting that the content of one or more of the memory sections do not match the one or more predefined data patterns, and processing one or more of the packets according to at least part of the received packet segment(s).

20 Claims, 5 Drawing Sheets

PREMATURE INCOMING PACKET PROCESSING

BACKGROUND

The present invention, in some embodiments thereof, relates to processing incoming data packets and, more specifically, but not exclusively, to increasing performance of incoming data packets processing by monitoring predefined fields of the incoming packets and initiating processing accordingly while the packets are still incoming.

In the current technological era, demand for increased computing power is constantly and rapidly growing. One major high-end computing sector relates to packet oriented processing systems, platforms, and/or applications, for example, networking, mass storage, video streaming, signal processing, IoT, and many more in which large volumes of data are transferred in packets.

Major efforts and resources are therefore invested in researching and developing more powerful, higher capacity and/or faster computing platforms, technologies, and/or architectures in general and for packet processing in particular.

SUMMARY

It is an object of the present invention to provide methods, systems and software program products for expediting processing of incoming data packets by monitoring predefined data fields of the incoming data and initiating processing accordingly before the entire packet is received. The foregoing and other objects are achieved by the features of the independent claims. Further implementation forms are apparent from the dependent claims, the description and the figures.

According to a first aspect of the present invention there is provided a method of processing incoming packets prior to complete reception, comprising:

Receiving a pointer to one or more memory blocks allocated for storing one or more incoming packets to be written by one or more another controllers. The one or more incoming packets comprise one or more packet segments.

Determining all valid data values of one or more fields contained in the one or more packet segments.

Initializing one or more memory sections in the one or more memory blocks mapped to the one or more fields with one or more predefined data pattern which are different from any of the valid values of the one or more fields.

Checking continuously content of the one or more memory sections.

Determining the one or more packet segments were written in the one or more memory blocks responsive to detecting the content of the one or more memory sections do not match the one or more predefined data patterns.

Processing the one or more packet according to at least part of the one or more packet segment.

According to a second aspect of the present invention there is provided a system for processing incoming packets prior to complete reception, comprising one or more processors executing a code. The code comprising:

Program instructions to receive a pointer to one or more memory blocks allocated for storing one or more incoming packets to be written by one or more another controllers. The one or more incoming packets comprises one or more packet segments.

Program instructions to determine all valid values of one or more fields contained in the one or more packet segments.

Program instructions to initialize one or more memory sections in the one or more memory blocks mapped to the one or more fields with one or more predefined data patterns which are different from any of the valid values of the one or more fields.

Program instructions to check continuously content of the one or more memory sections.

Program instructions to determine the one or more packet segments were written in the one or more memory blocks responsive to detecting the content of the one or more memory sections do not match the one or more predefined data patterns.

Program instructions to process the one or more packets according to at least part of the one or more packet segments.

In an optional implementation form of the first and/or second aspects, the following is conducted: initiating, prior to the one or more packet segments written to the one or more memory blocks, a plurality of speculative execution threads each according to a respective one of a plurality of valid values of the one or more fields, reading a value of the one or more fields responsive to determining the one or more packet segments were written in the one or more memory blocks, and terminating each of the plurality of speculative execution threads which was initiated according to a respective value of the one or more fields different from the determined value of the one or more fields.

In an optional implementation form of the first and/or second aspects, one or more execution threads are initiated according to the determined value of the one or more fields responsive to determining that none of the plurality of speculative execution threads was initiated according to the determined value of the one or more fields.

In a further implementation form of the first and/or second aspects, the one or more packets are processed according to a value of the one or more fields.

In a further implementation form of the first and/or second aspects, the one or more packet segments are written atomically in the one or more memory blocks. The one or more packets are processed according to a value of at least part of the one or more packet segments different from the one or more fields.

In a further implementation form of the first and/or second aspects, the one or more another controllers are further adapted to insert one or more predefined values in the one or more fields.

In an optional implementation form of the first and/or second aspects, checking the content of the one or more memory sections is paused for a predefined delay time period following each check of the content of the one or more memory sections.

In an optional implementation form of the first and/or second aspects, a hardware delay mechanism is used for periodically checking the content of the one or more memory sections.

In an optional implementation form of the first and/or second aspects, a hardware lookup mechanism is used for monitoring the one or more memory sections and generating a notification upon change of the content of the one or more memory sections.

In a further implementation form of the first and/or second aspects, the one or more incoming packets comprise one or more of a network packet received from one or more network controllers, a shared memory packet received from one or more another processors, a data block loaded by one or more mass-storage devices, and/or a data packet received from one or more media controllers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
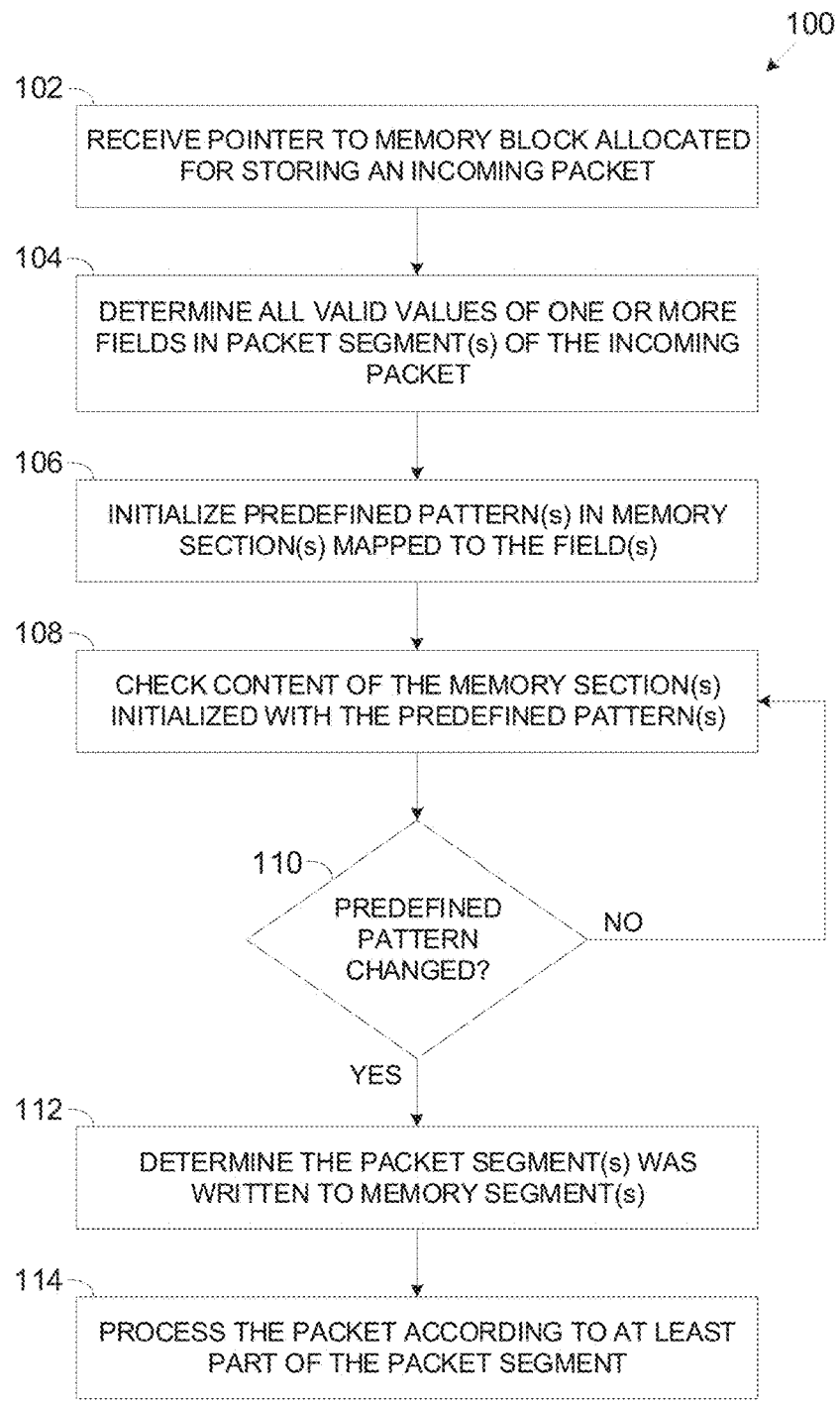
FIG. 1A and FIG. 1B show a flowchart of an exemplary process of processing incoming data packets while still incoming, according to some embodiments of the present invention.

The present invention, in some embodiments thereof, relates to processing incoming data packets and, more specifically, but not exclusively, to increasing performance of incoming data packets processing by monitoring predefined fields of the incoming packets and initiating processing accordingly while the packets are still incoming.

Many computing systems, environments, and/or platforms involve transfer of large chunks of data received from one or more controllers for processing by one or more processors, typically designated host processors.

Such controllers may include, for example one or more network controllers connected to one or more networks and/or links which may receive incoming network packets which need to be processed (e.g., routed, inspected, etc.) by the host processor. In another example, the controllers may include one or more other host processors adapted to transfer shared memory messages for processing by the host processor. In another example, the controllers may include one or more a mass-storage controllers connected to one or more storage media devices (e.g., hard drive, Network Attached Storage (NAS), etc.) which may transfer data packets (blocks) from the storage media for processing by the host processor. In another example, the controllers may include one or more a media controllers (e.g., video controller, H.265 codec, audio controller, etc.) which may receive media packets which need to be processed by the host processor. Such controllers may further include other devices, controllers, and/or processors, for example, a Graphic Processing Unit (GPU), a Digital Signals Processor (DSP), and/or the like which may transfer data for processing by the host processor.

Since volume of the transferred data may be very large and/or received over time, it is typically packet oriented, meaning that the data is transferred and received from the controller in a plurality of packets which may be each processed by the host processor.

The incoming packets (packets, messages, blocks, etc.) may be written by the controller(s) to memory blocks (regions) allocated in a memory accessible to the host processors, typically designated system memory such that the host processor may access the memory to retrieve the received packets.

Typically, the controller(s) may notify the host processor that transfer (write) of one or more packets is complete and available for processing by the host processor.

In many scenarios, deployments and/or applications, the host processor may process the incoming packets according to at least part of their content, for example, one or more fields, one or more data items, variables, and/or the like included in one or more of the packets.

According to some embodiments of the present invention, there are provided systems, methods and computer program products for processing premature incoming packets, i.e., processing packets while still incoming, before entirely received.

Specifically, the host processor may start processing an incoming packet before the full packet is written to the memory according to at least part of its content which has arrived and from a controller is updated in the memory.

In order to detect arrival of at least part of a packet stored in its allocated memory block in memory before the packet fully arrives and reported accordingly by a respective controller, the host processor may monitor one or more memory sections in the memory block allocated for the packet in order to identify a change in content of these memory sections which indicates that at least part of the incoming packet was written by the controller and is now updated in the memory block allocated for the incoming packet.

However, in order to identify the change in the content to the memory section(s), the initial content of the memory section(s) must be different from any valid value that may be written by the controller. To this end, prior to allocating the memory block to the controller, the host processor may initialize the memory section(s) which map respective fields of the incoming packet with one or more predefined data patterns which are different from any valid value of the respective fields such that the predefined data pattern is not a valid value of the respective fields and therefore cannot be written by the controller.

The host processor may then continuously or periodically check (monitor, poll, etc.) the content of the memory sections to identify and determine that at least part of the incoming packet was written by the controller and is now available in the memory.

When an incoming packet and/or part thereof is written in its allocated memory block by the controller, the predefined data pattern(s) stored in the memory section(s) may change and thus indicate that at least part of the incoming packet is updated in the memory block.

Responsive to detecting a change in the predefined data pattern in one or more of the memory sections mapping the respective field(s), the host processor may determine that this field(s) is now updated in the memory and may start processing the incoming packet.

Specifically, the host processor may start processing the incoming packet according to at least part of its content that is already received as determined by the change of the memory section(s) mapping the field(s).

For example, the host processor may process the incoming packet according to one or more of the fields which were initially initialized with the predefined data pattern(s) to detect the change indicative of the controller writing them in the memory.

Optionally, the host processor may process the incoming packet according to at least part of the packet which is different from the field(s) used to detect the arrival of the packet, specifically, one or more sections of the packet, for example, a field, a data item, an offset, a payload, and/or the like which may receive any value and therefore cannot be used to detect arrival of at least part of the packet since there is no predefined data pattern that is different from the valid values of these packet sections.

This may be done since, the packet may be typically transferred to the memory in a plurality of segments, for example, using Direct Memory Access (DMA) engines such that each packet segment may be written atomically to a respective memory segment in the memory block allocated for storing the respective packet in the memory. The size of each memory segment may be typically defined according to one or more system and/or processor architecture operational parameters and/or considerations, for example, a cache line (e.g., 32 bytes, 64 bytes, 128 bytes, etc.), and/or the like.

Atomic writing means that while the packet segment is written to a respective memory segment, no other device may interfere with the transfer such that the entire packet segment is fully written with no interruptions. As such, once the transfer of a packet segment starts, the host processor may access the respective memory segment storing this packet segment only after it is fully written and updated in the memory segment.

Therefore, one or more first memory sections mapping respective fields of a certain packet segment may be initialized with predefined data pattern(s) and used to detect arrival of the packet segment while one or more other (second) sections of the packet segment may be used by the host processor for processing the incoming packet accordingly, i.e., the host processor may process the incoming packet according to the second section(s).

Optionally, rather than waiting for arrival and update in memory of the packet section(s) according to which the packet should be processed, the host processor may speculatively initiate a plurality of execution threads each according to a respective one or plurality of valid values of the packet section(s) dictating and/or defining packet processing.

In such case, the host processor may continue monitoring the memory sections mapping the memory section(s) mapping the packet field(s) and/or section(s) and when they are written by the controller and updated in memory, the host processor may identify the actual value written for this section(s) and terminate all execution threads which were initiated for processing the packet according to values of the packet section(s) different from the actual value.

Moreover, in case none of the speculative execution threads was initiated for processing the packet according to the actual value identified for the packet section(s), the host processor may start processing the packet according to the actual value.

Processing incoming packets while still incoming may present major advantages and benefits compared to existing packet processing systems and methods.

First, starting to process incoming packets before they are fully received may significantly increase packet processing performance, for example, reduce latency, increase processing bandwidth, and/or the like compared to the existing methods which may start processing each packet only after the packet is fully received which is typically reported by the respective controller which transferred the packet into the memory, for example, the controller, a DMA engine, and/or the like.

Moreover, speculatively initiating a plurality of execution threads each launched for processing an incoming packet according to a respective one of a plurality of valid values of one or more sections of the incoming packet according to which the packet should be processed may further increase packet processing performance since the host processor may not idly wait for these sections to arrive and update in memory but may rather start processing the packet significantly earlier thus expediting processing of the packet.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
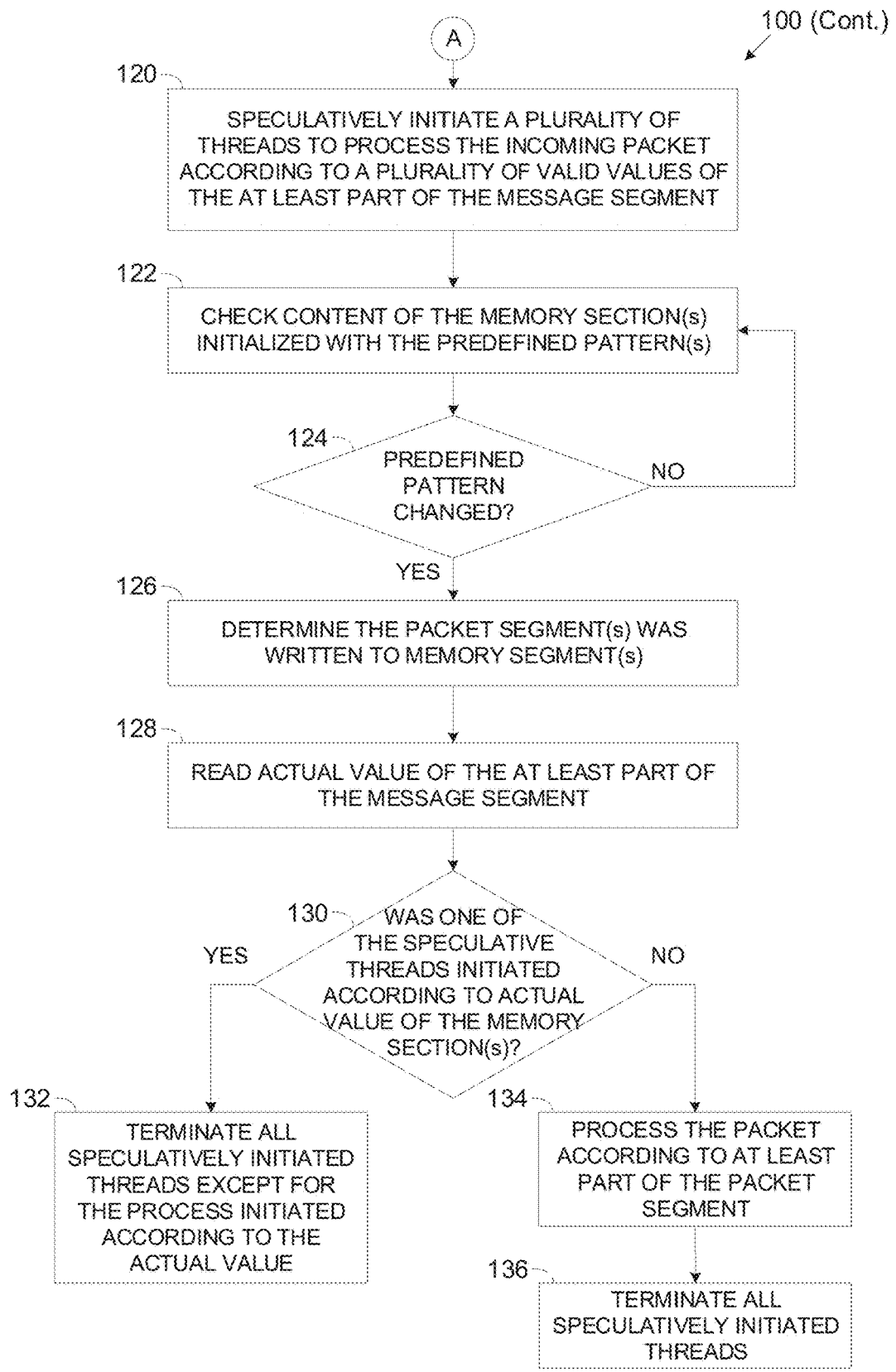

Referring to the drawings, FIG. 1A and FIG. 1B show a flowchart of an exemplary process of processing incoming data packets while still incoming, according to some embodiments of the present invention.

An exemplary process 100 may be executed by one or more processors, typically host processors to process incoming data packets, messages, and/or blocks, collectively designated packets herein after, into memory by one or more other controllers while the packets are still incoming, i.e., the full packet data is not yet available in the memory.

In particular, the host processor monitor one or more memory sections allocated in memory for storing one or more predefined fields of the packet, written to the memory by another controller before the entire packet is fully received, and start processing the packet accordingly while it is still incoming, specifically according to at least part of the packet which has already arrived and available in the memory.

In order to detect that the predefined field(s) are updated in the memory by the other controller, the host processor may initialize the memory sections allocated to store these fields with some pattern which is different from valid patterns (values) allowable for the predefined field(s).

Optionally, rather than waiting for the predefined field(s) to arrive and update in the memory, the host processor may initiate a plurality of speculative execution threads each for processing the incoming packet(s) according to a receptive one of a plurality of possible (valid) values of one or more segments of the packet(s), for example, a field, a data value, and/or the like. Upon arrival of the field(s) or data value(s) according to which the packet should be processed, the host processor may maintain a process speculatively initiated to process the packet according to the actual value of the field or data that arrived from the controller and terminate all other threads.

Figure 2:
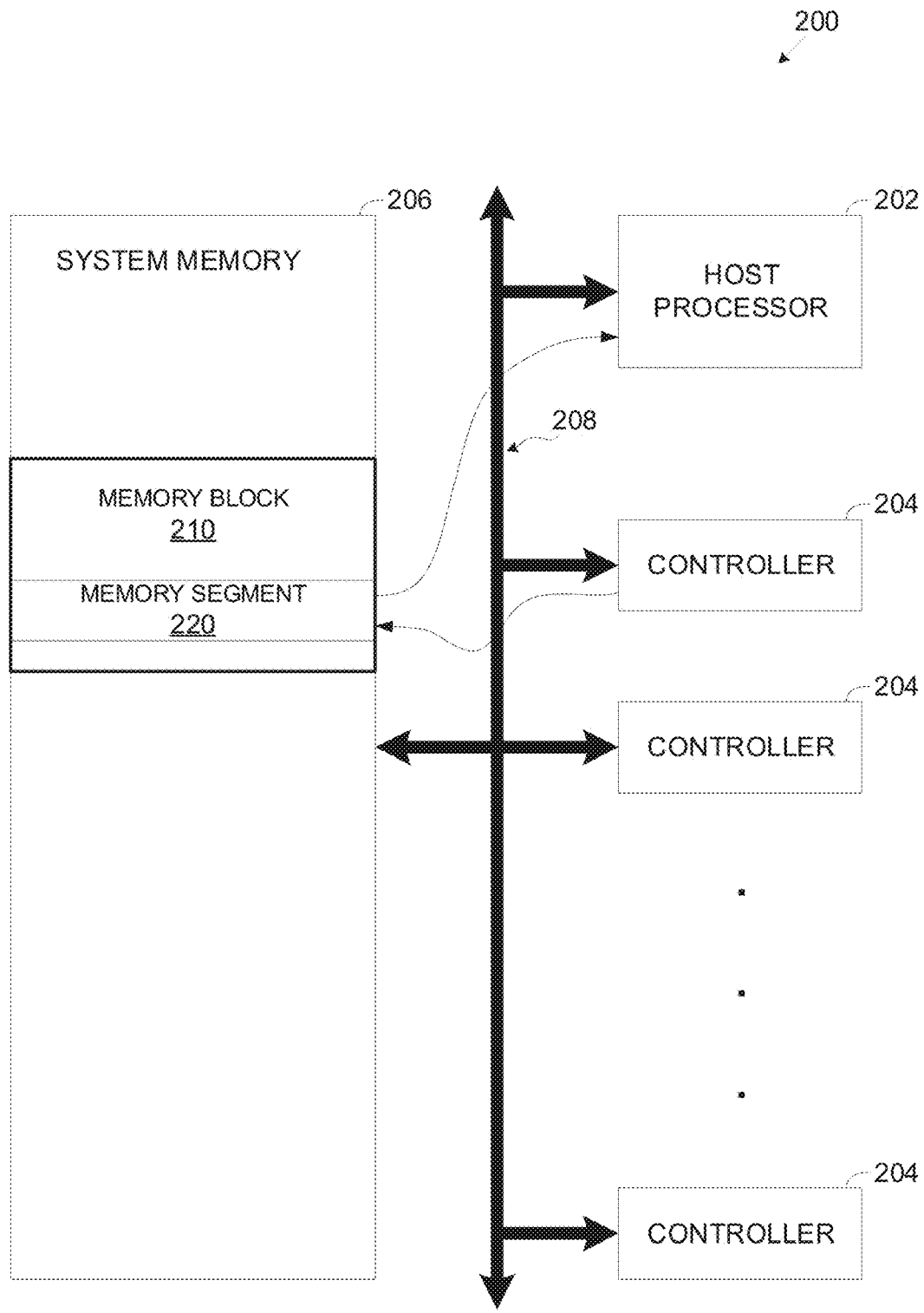
FIG. 2 is a schematic illustration of an exemplary system for processing incoming data packets while still incoming, according to some embodiments of the present invention.

Reference is also made to FIG. 2, which is a schematic illustration of an exemplary system for processing incoming data packets while still incoming, according to some embodiments of the present invention.

An exemplary computing system 200 may include one or more host processors 202 adapted for processing data received from one or more controllers 204, for example, a network controller, a mass-storage controller, a media controller (e.g., video controller, audio controller, image sensor controller, etc.), a Graphic Processing Unit (GPU), a Digital Signals Processor (DSP), another processor, and/or the like.

The controller(s) 204 may transfer (write) received data to a memory 206, for example, a system memory deployed to support the host processor 202.

The host processor 202 and the controller(s) 204 may access the memory 206 and optionally communicate with each other via a bus 208 comprising one or more interconnections, channels, busses, links, and/or the like such as, for example, system bus, memory bus, Peripheral Component Interconnect (PCI), PCI Express (PCIe), InfiniBand, and/or the like. The bus 208 may employ one or more bus architectures as known in the art, which are beyond the scope of the present disclosure.

Since the controllers 204 may transfer large chunks of data to the memory 206 optionally data received over time, the data received from such controllers 204 is typically packet oriented, meaning that the data is received in a plurality of packets which may be each processed by the host processor 202.

As such, the controller(s) 204 may write incoming packets (packets, messages, blocks, etc.) to memory blocks (regions) 210 allocated in the memory 206 such that the host processor 202 may access the memory 206 to retrieve (read) the incoming data packets and process them.

As known in the art, in order to efficiently transfer the incoming packets to the memory 206, the controller(s) 204 may use one or more Direct Memory Access (DMA) engines.

The DMA engines may be typically integrated within one or more of the controllers 204. However, optionally one or more of the controllers 204 transfer data packets to the memory 206 using one or more independent DMA engines which may be available in one or more other devices, for example, a DMA controller, a bridge device, a switch fabric gate, and/or the like.

While the incoming packets may be significantly large, due to various system considerations and mechanisms which are out of scope of the present disclosure (e.g., arbitration, bus starvation, etc.), the DMA engines may transfer each packet to the memory 206 in a plurality of segments, i.e., packet segments.

Moreover, due to further considerations and mechanism, for example, cache coherency, incoming data monitoring, and/or the like which are also out of scope of the present disclosure, each of the packet segments of each packet may be written atomically to a respective memory segment 220 in the memory block 210 allocated for storing the respective packet in the memory 206. The size of the memory segment 220 may be typically defined according to one or more system and/or processor architecture operational parameters and/or considerations. For example, the size of the memory segment 220 may be set to match the size of a cache line of the host processor 202, for example, 32 bytes, 64 bytes, 128 bytes, and/or the like.

As such, while a respective packet segment is written into its respective memory segment 220, other devices, and specifically the host processor 202 may be unable to access the respective memory segment 220. This means that the host processor 202 may access the respective memory segment 220, allocated for storing a respective packet segment, either before any of the packet segment it is written by the controller 204 (using a DMA engine) or only after the packet segment is fully written in its respective memory segment 220.

Therefore, when the host processor 202 is able to access a respective memory segment 220 allocated for storing a respective packet segment, the respective memory segment 220 may either store no data at all of the corresponding packet segment or the respective memory segment 220 may store the entire corresponding packet segment.

It should be noted that controlling, managing, and/or ensuring atomic write transactions to memory segments 220 may be done using one or more mechanisms and/or architectures as known in the art, and is out of scope of the present disclosure.

For brevity, the process 100 describes receiving a single packet from a single controller 204, storing it in a single memory block 210, and processing it by the host processor 202 according to a value of one or more predefined fields. This however, should not be construed as limiting since the process 100 may be repeated, expanded and/or scaled to receive a plurality of packets from a plurality of controllers 204, storing the received packets in one or more memory blocks 210 and processing them by the host processor 202.

Moreover, for brevity the process 100 is described to be executed by the host processor 202 while in practice the process 100 may be executed by one or more software modules, for example, a process, a script, an application, an agent, a utility, a tool, an operating system (OS), a service, a plug-in, an add-on and/or the like each comprising a plurality of program instructions executed by the host processor 202.

Furthermore, the host processor 202 may execute the process 100 and/or part thereof using one or more hardware elements available in the system 200, optionally in the host processor 202 itself, for example, an Integrated Circuit (IC), an Application Specific IC (ASIC), a Field Programmable Gate Array (FPGA), a network processor, and/or the like.

As shown at 102, a host processor 202 may receive a pointer to a memory block such as the memory block 210 allocated for storing an incoming data packet which is to be written in the memory 206 by a controller 204.

As described herein before, the controller 204 may transfer data packed in packets into the memory 206 where the host processor 202 may access the received packets and process them. For example, a network controller 204 connected to one or more networks and/or links, for example, Ethernet, InfiniBand, and/or the like may receive a plurality of incoming network packets which need to be processed (e.g., routed, inspected, etc.) by the host processor 202. In another example, another processor, for example, another host processor such as the host processor 202 may transfer a plurality of shared memory messages (packets) to the memory 206 for processing by the host processor 202. In another example, a mass-storage controller 204 connected to one or more storage media devices, for example, a hard drive, a Network Attached Storage (NAS), and/or the like may transfer data packets (blocks) from the storage media device(s) for processing by the host processor 202. In another example, a media controller 204, for example, a video controller 204 (e.g., H.265, etc.), an audio controller, and/or the like may receive media packets, for example, video packets which need to be processed (e.g., decoded, played, stored, routed, etc.) by the host processor 202.

As known in the art, managing the memory 206 comprises memory (blocks) allocation for tasks executed by the host processor 202 and optionally by one or more other controllers 204 to ensure each memory resource (segment, block, etc.) is allocated to a single task at any given time in order to prevent overwrite and/or overflow, ensure data integrity, and/or the like.

Therefore, prior to receiving the incoming packet, a memory block 210 is allocated for storing it. One or more architectures methods, and/or implementations may be applied for allocating the memory block 210 for storing the incoming packet. For example, the memory block 210 may be allocated by the host processor 202 itself. In such case, the pointer to the allocated memory block 210 may be received, for example, from one or more memory management routines executed by the host processor 202 to manage the memory 206. For example, assuming the host processor 202 executes an OS, the pointer may be assigned by one or more OS routines, for example, malloc( ), and/or the like. In another example, the memory block 210 may be allocated by the controller 204 before transferring the packet to the memory 206. In such case, the host processor 202 may communicate with the controller 204 to receive the pointer to the allocated memory block 210. In another example, the memory block 210 may be allocated by another processor deployed in the system 200 to manage the memory 206, optionally among other task(s). In such case, the host processor 202 may communicate with the other processor to receive the pointer to the allocated memory block 210.

As shown at 104, the host processor 202 may determine valid data patterns of one or more fields contained in one or more packet segments of the incoming packet.

In particular, the host processor 202 may determine valid data patterns of field(s) contained in one or more packet segments of interest to the host processor 202, i.e., segments according to which the host processor 202 may process the incoming packet.

The host processor 202 may apply one or more methods to determine the valid values of one or more of the fields.

For example, the incoming packet may comprise one or more headers each comprising one or more fields which are located at predefined locations (offset) in the packet and may comprise one or more valid values. The predefined locations (offset) of the fields and their valid values may be predefined and thus known to the host processor 202.

For example, a network packet received from a network controller 204 may comprise one or more network parameter fields located, for example, in a header of the packet which store respective valid values expressing one or more network parameters relating to the packet, for example, a protocol type (e.g., IPv4, IPv6, etc.), a source address, a destination address, and/or the like.

In another example, a shared memory message (packet) received from another host processor 204 may comprise one or more message fields which may store one or more predefined values expressing one or more message parameters, for example, an identifier (ID) of the other host processor 204, a timestamp, and/or the like.

In another example, a data block (packet) received from a mass-storage controller may comprise one or more fields which may store one or more predefined values expressing one or more parameters relating to the data block, for example, a block ID, a timestamp, and/or the like In another example, a media packet, for example, an H.265 streaming video packet received from a streaming video controller may comprise one or more video parameter fields located, for example, in a header of the packet which store respective valid values expressing one or more video parameters relating to the packet, for example, a compression type (e.g., MPEG-2, H.264, H.265, etc.), a stream ID, a timestamp and/or the like.

In another example, the incoming packet may comprise one or more fields which may never store a certain value. For example, a certain field of the packet may never comprise an all-zeros value. In another example, a certain field of the packet may never comprise an all-ones (0xFF . . . ) value.

Optionally, the controller 204 may be adapted to insert one or more predefined values in one or more fields, locations, and/or offsets of the incoming packet. For example, the controller 204 may adjust the value of one or more reserved fields in a header of the incoming packet to store one or more predefined values, for example, 0x55, 0xAA, and/or the like.

In another example, the controller 204 may adjust the value of one or more predefined offsets in a payload of the incoming packet to store one or more predefined values, for example, 0x00, 0xFF, and/or the like. In such case the predefined offset(s) may be considered fields. For example, the controller 204 may set a certain value, for example, 0xAA in byte at offset 0x7 in each of one or more packet segments containing the packet payload.

Moreover, the controller 204 may be further adapted to adjust the value of a plurality periodic predefined offsets in the payload of the incoming packet, for example, every $32^{th}$ byte, every $64^{th}$ byte, every $128^{th}$ byte and/or the like. Furthermore, the controller 204 may be adapted to adjust the value in one or more offsets in each of the packet segments of the packet such that each packet segment may comprise one or more fields having predefined value(s).

As shown at 106, the host processor 202 may initialize one or more memory sections in the memory block 210 with one or more predefined data patterns.

In particular, the host processor 202 may initialize, with the predefined data pattern(s), memory section(s) in one or more memory segments 220 which map the field(s) for which the valid value(s) was determined. This means that the host processor 202 may write the predefined data pattern(s) in memory section(s) in memory segment(s) 220 mapping packet segment(s) of interest to the host processor 202 for processing the incoming packet, i.e., packet segment(s) and/or part thereof according to which the host processor 202 may process the incoming packet.

The host processor 202 may select the predefine data pattern for each memory section mapping a respective field of the packet according to the valid value(s) determined for the respective field.

Specifically, the host processor 202 may initialize each memory section with a predefined data pattern which is different from any of the valid values determined for the field mapped to the respective memory section. For example, assuming a certain byte size field may have 2 valid values, for impale, 0x40, and 0x80. In such case, the host processor may initialize the memory section mapped to the certain field with a value 0xFF. In another example, assuming a certain byte word size field may have a plurality of valid values which are all not all-zeros, meaning the value 0x0000 is not valid value of the certain field. In such case, the host processor may initialize the memory section mapped to the certain field with a value 0x0000.

As shown at 108, the host processor 202 may check the content of the memory section(s) initialized with the predefined pattern(s).

As shown at 110, which is a conditional step, in case the host processor 202 detects that the content of the memory section(s) is changed, i.e., the content does not match the predefined pattern(s) previously written to the memory section(s), the process 100 may determine that the memory section(s) was overwritten by the controller 204 and the may branch to 112. Otherwise since the content of the memory section(s) is not changed, i.e., it matches the predefined data pattern(s), the process 100 may branch back to 108.

Obviously, the process 100 may branch back to 108 repeatedly until the content of the memory section(s) changes.

Optionally, the host processor 220 may pause. i.e., wait, for a predefined delay time period following each check of the content of the one or more memory sections to detect a change in the content. In other words, the host processor 220 may wait between successive accesses to the memory 206 made for checking the content of the memory section(s). The host processor 220 may insert delays, for example, 1 milliseconds (ms), 2 ms, 5 milliseconds, and/or the like in order to prevent excessive accesses of the host processor 202 to poll the memory 206 which may overload the system 200, the bus 208, and/or the host processor 202 which may prevent and/or delay execution of other tasks.

The host processor 220

Optionally, the host processor 220 may use one or more hardware delay mechanisms adapted as known in the art to periodically check of the content of the one or more of the memory section(s) initialized with the predefined data pattern(s).

Optionally, the host processor 220 may use one or more hardware lookup mechanisms adapted as known in the art to report a change in the content of the one or more of the memory section(s) initialized with the predefined data pattern(s).

As shown at 112, since the content of the memory section(s) does not match the predefined data pattern(s) initially written by the host processor 202 to the memory section(s), the host processor 202 may determine that the memory section(s) was overwritten by the controller 204 and now contains one of the valid values of the field(s) mapped to the memory section(s).

Moreover, since as described herein before, each of the packet segments of the incoming packet may be written atomically into a respective memory segment 220 in the memory block 210 allocated for storing the incoming packet, the host processor 202 may determine that an entire corresponding packet segment was written in each memory segment 220 by the controller 204. This is because, since the controller 204 atomically writes each memory segment 220 in its entirety, a single change in the respective memory segment 220, i.e., a change in the field(s), is indicative that the entire memory segment 220 was overwritten by the controller 204.

As shown at 114, the host processor 202 may process the incoming packet and/or part thereof.

In particular, the host processor 202 may process the incoming packet according to at least part, i.e., pone or more packet sections of one or more of the packet segments which may be each written atomically by the controller 204 in a respective memory segment 220.

For example, the host processor 202 may process the packet according to one or more of the fields used by the host processor 202 to determine whether the packet segment(s) was written by the controller 204 to respective memory segment(s) 220. For example, assuming the incoming packet is a network packet written to the memory block 210 by a network controller 204. Further assuming that the host processor 202 determined that a certain packet segment of the packet was written by the network controller 204 to a respective memory segment 220 based on a change in the content of a memory section mapping a certain network parameter field, for example, transmission protocol IPv4 or IPv6. In such case the host processor 202 may start processing the incoming packet according to the actual value (IPv4 or IPV6) written by the controller 204 in the respective memory section.

However, since each packet segment may be written atomically to a respective memory segment 220, once the host processor 202 determines that a respective memory segment 220 was written to by the controller 204, the entire respective memory segment 220 now stores valid data of the corresponding packet segment. The host processor 202 may therefore process the packet according to at least part of the corresponding packet segment, i.e., one or more packet sections different from the fields used to determine whether the packet segment(s) was written by the controller 204.

For example, assuming the host processor 202 is adapted to process the incoming packet according to a certain section of a certain packet segment, for example, a (value of) first field in the certain packet segment for which any value is valid. This means that the first field cannot be used to detect whether the certain packet segment was written by the controller 204 since any data pattern is valid for the second field and thus the first field therefore may not be initialized with a predefined data pattern that is different from the its valid values. In such case, the host processor 202 may initialize a second first field in the certain packet segment have a limited number of valid values, for example, four, with a predefined data pattern different from any of the four valid values of the second field. The host processor 202 may then detect that the certain packet segment was written to a respective memory segment 220 based on change of the predefined data pattern of the second field and may then process the packet and/or part thereof according to the value of the first field.

Moreover, the host processor 202 may process the packet according to any combination of one or more fields or data offsets of one or more packet segments written to corresponding memory segments 220 whether these fields and/or offsets were used to determine whether the packet segment(s) is updated in the memory segment 220 or other fields and/or data offsets of the packet segment(s) different from those used to determine that the packet segment(s) were written by the controller 204.

According to some embodiments of the present invention, the host processor 202 may initiate a plurality of speculative execution threads for processing the incoming packet and/or part thereof before the controller 204 writes package segment(s) comprising data according to which the host processor 202 should process the incoming packet.

This means that even before the field(s) and/or data offset(s), according to which the host processor 202 may process the packet, are received, i.e., written to the memory segment(s) 220, the host processor 202 may initiate a plurality of speculative execution threads each directed to process the incoming packet and/or part thereof according to a respective one of a plurality of valid values of one or more of the fields and/or data offsets of one or more packet segments.

As shown by (A), since the content of the memory section(s) is not changed, i.e., it still matches the predefined data pattern(s) initially written by the host processor 202 to the memory section(s), rather than branching back to 108, the host processor 202 may optionally branch to 120.

As shown at 120, the host processor 202 may initiate a plurality of speculative execution threads for processing the incoming packet and/or part thereof.

Each speculative execution thread may be initiated by the host processor 202 for processing the incoming packet and/or part thereof according to a respective one of a plurality of valid values of one or more of the fields and/or data offsets of one or more packet segments.

For example, assuming a certain field according to which the host processor 202 should process the incoming packet comprises three valid values, for example, 0x01, 0x02, and 0x04. While the packet segment comprising the certain field is not yet written to a corresponding memory segment 220, the host processor 202 may initiate three speculative execution threads, a first execution thread for processing the packet and/or part thereof according to the first value 0x01, a second execution thread for processing the packet and/or part thereof according to the second value 0x02, and a third execution thread for processing the packet and/or part thereof according to the third value 0x04.

As shown at 122, 124, and 126, the host processor 202 may continuously check the content of the memory section(s) initialized with the predefined pattern(s) until detecting a change in the connect and determine accordingly that respective memory segment(s) 220 are overwritten by the controller 204 as described in steps 108, 110, and 112 respectively.

As shown at 128, after determining that the memory section(s) was overwritten by the controller 204 and now contains one of the valid values of the field(s) mapped to the memory section(s), the host processor 202 may determine that the respective memory segment(s) 220 now store the corresponding packet segment(s).

The host processor 202 may therefore access the respective memory segment(s) 220 to read the actual value of at least part of the packet segment(s) according to which the packet and/or part thereof should be processed.

As shown at 130, which is a conditional step, in case one of the speculative execution threads initiated by the host processor 202, in step 120, was initiated for processing the incoming packet and/or part thereof according to the actual value of the at least part of the packet segment written by the controller 204 as determined in step 126, the process 100 may branch to 132.

However, in case none of the speculative execution threads was initiated for processing the incoming packet and/or part thereof according to the actual value of the at least part of the packet segment written by the controller 204, the process may branch to 134.

As shown at 132, the host processor 202 may terminate all speculative execution threads except the execution thread initiated for processing the incoming packet and/or part thereof according to the actual value of the at least part of the packet segment written by the controller 204 since the other speculative execution thread are not relevant.

For example, continuing the previous exemplary speculative execution where three execution threads were initiated, in step 120, for processing the packet and/or part thereof according to a first value 0x01, a second value 0x02, and a third value 0x04 of a certain field. Assuming that in step 128, the host processor 202 determines that the actual value of the certain field, written by the controller 204, is 0x02. In such case, the host processor 202 may terminate the irrelevant first and third speculative execution threads initiated for processing the packet according to values 0x01 and 0x04 of the certain field while maintaining the second speculative execution thread initiated for processing the packet according to values 0x02 and is thus relevant.

Optionally, in case one or more of the speculative execution threads has already completed, the host processor 202 may discard outputs, outcomes, results, and/or data generated by the irrelevant speculative execution threads and maintain outputs, outcomes, results, and/or data generated by the relevant speculative execution thread.

As shown at 134, since none of the speculative execution threads was initiated for processing the incoming packet and/or part thereof according to the actual value of the at least part of the packet segment, the host processor 202 may initiate another execution thread to process the incoming packet and/or part thereof according to the actual value of the at least part of the packet segment.

For example, assuming a certain field has eight valid values 0x01 to 0x07. Further assuming three exemplary speculative execution threads were initiated, in step 120, for processing the packet and/or part thereof according to a first value 0x01, a second value 0x02, and a third value 0x04 of the certain field. Assuming that in step 128, the host processor 202 determines that the actual value of the certain field, written by the controller 204, is 0x05. In such case the host processor 202 may initiate an execution thread for processing the packet and/or part thereof according to the actual value 0x05, As shown at 136, the host processor 202 may terminate all of the speculative execution threads since they are all irrelevant as they are not directed to processing the incoming packet and/or part thereof according to the actual value of the at least part of the packet segment.

Continuing the previous example, assuming three exemplary speculative execution threads were initiated, in step 120, for processing the packet and/or part thereof according to a first value 0x01, a second value 0x02, and a third value 0x04 of a certain field while the actual value of the certain field, written by the controller 204, is 0xC0. In such case, the host processor 202 may terminate all three speculative execution threads which are irrelevant.

Obviously, the host processor 202 may execute steps 134 and 136 in any order, i.e., step 134 first and 136 afterwards or vice versa, 136 first and then step 134.

Figure 3:
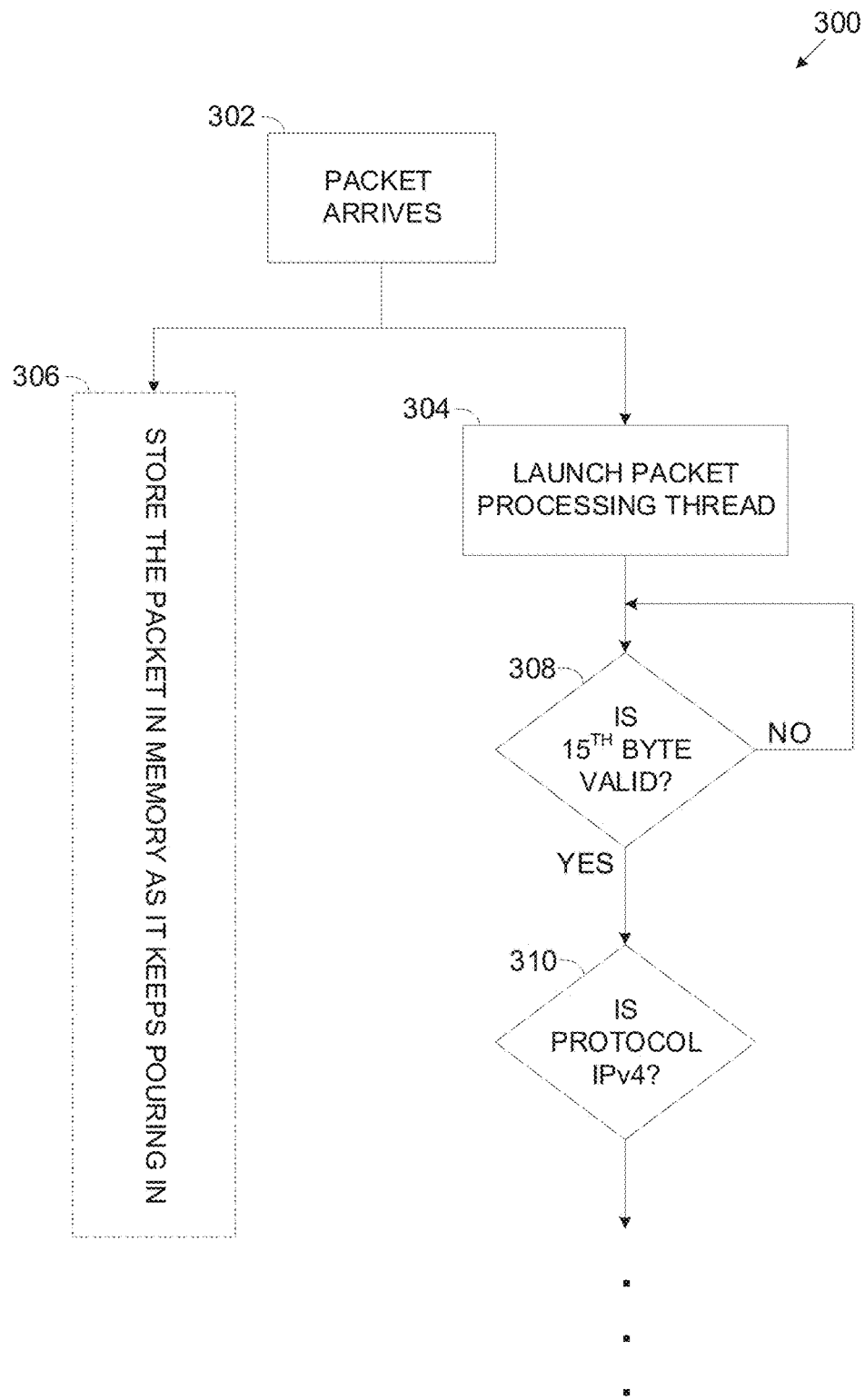
FIG. 3 is a schematic illustration of an exemplary sequence for processing incoming network packets while still incoming, according to some embodiments of the present invention.
Figure 4:
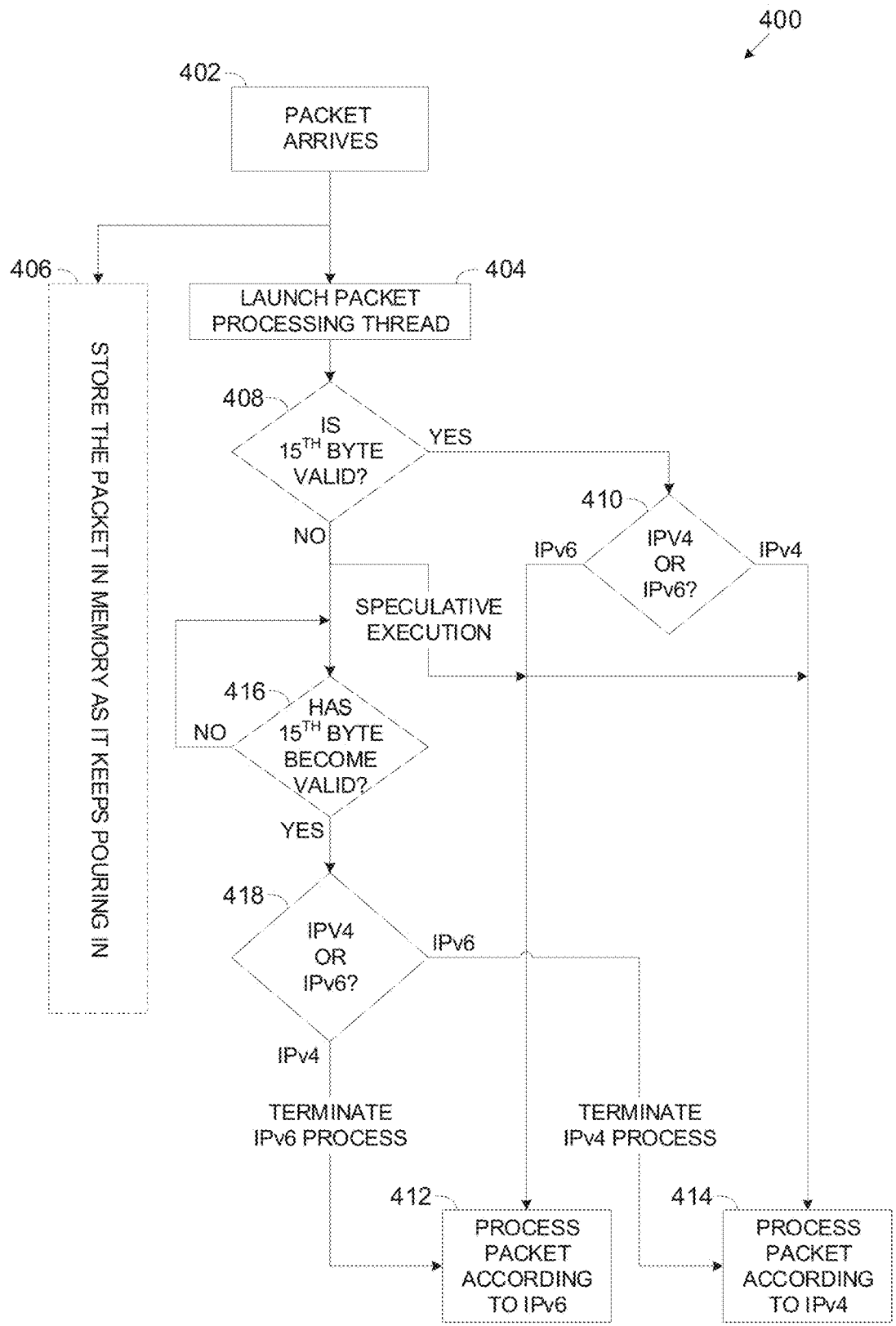
FIG. 4 is a flowchart of an exemplary process of speculatively processing incoming network packets while still incoming, according to some embodiments of the present invention.

Reference is now made to FIG. 3, which is a schematic illustration of an exemplary sequence for processing incoming network packets while still incoming, according to some embodiments of the present invention. Reference is also made to FIG. 4, which is a flowchart of an exemplary process of speculatively processing incoming network packets while still incoming, according to some embodiments of the present invention.

As seen in 302, an exemplary sequence 300 starts with arrival of an incoming network packet. i.e., a controller such as the controller 204, specifically a network controller 204 writing a network packet to a memory block such as the memory block 210 in a memory such as the memory 206.

As seen in 304, a host processor such as the host processor 202 may launch (initiate, invoke, etc.) a packet processing thread for processing the incoming packet while the incoming packet is still pouring in (arriving) and stored in the memory block 210 as seen in 306.

As seen in 308, the host processor 202 may check (monitor, poll, probe) a memory section in the memory block 210 which map a certain field in a certain packet segment of the incoming packet, for example, a protocol field indicating whether the incoming packet is an IPv4 packet or an IPv6 packet. In particular, prior to arrival of the packet, the host processor 202 initializes the memory section mapping the protocol field with a predefined data pattern (e.g., 0xFF, 0x00, etc.) which is different from any valid values of the protocol field, for example, values corresponding to IPv4 and IPv6.

The host processor 202 may continuously and/or periodically check the memory section until it detects a change in the predefined data pattern which indicates that the packet segment comprising the protocol field was written by the network controller 204 to the memory block 210.

The host processor 202 may then continue processing the incoming packet according to the value of the protocol field. For example, the host processor 202 may route the incoming packet in case the packet is an IPv4 packet and take no action in case the packet is not IPv4.

As seen in 402, an exemplary sequence 400 starts similarly to the sequence 300 with arrival of an incoming network packet written by a network controller 204 to a memory block 210 in the memory 206. Moreover, as seen in 404 and 406, the host processor 202 may launch a packet processing thread for processing the incoming packet while the incoming packet is still pouring into the memory 206 and stored in the memory block 210.

As seen in 408, the host processor 202 may check the memory section which maps the protocol field where, as described in step 308 of the sequence 300, was initialized with a predefined data pattern (e.g., 0xFF, 0x00, etc.) which is different from the valid values of the protocol field, for example, values corresponding to IPv4 and IPv6.

In case the predefined data pattern is changed, indicating that the protocol field was written to its memory section in the memory block 210, the sequence may branch to 410 where the host processor may check which protocol the incoming packet conforms.

In case the protocol field indicates the incoming packet is an IPv6 packet, the host processor 202 may branch to 412 and process the packet accordingly, i.e., as an IPv6 packet. In case the protocol field indicates the incoming packet is an IPv4 packet, the host processor 202 may branch to 414 and process the packet accordingly, i.e., as an IPv4 packet.

However, while checking (polling) the memory section mapping the protocol field in step 408, in case the predefined data pattern is not changed, meaning that the protocol field is not yet received from the controller 204 and written to its memory section, rather than waiting for the protocol field to arrive and update in the memory 206, the host processor 202 may initiate speculative processing.

Specifically, the host processor 202 may branch to 416 and also initiate (launch) two speculative execution threads, a first packet processing thread which may start processing the incoming packet as if it is an IPv6 packet and a second packet processing thread which may start processing the incoming packet as if it is an IPv4 packet as described in 412 and 414 respectively.

As seen in 416, while the two speculative packet processing threads are executing, the host processor 202 may keep checking (polling) the memory section mapping the protocol field, continuously or periodically, until the predefined data pattern stored in the memory section is changed thus indicating that the protocol field has arrived and is updated in the memory block 210.

As seen in 418, after the protocol field is updated in the memory block, the host processor 202 may check its value and determine whether the incoming packet is an IPv4 packet or an IPv6 packet.

In case the protocol field indicates the incoming packet is an IPv6 packet, the host processor may terminate the speculative packet processing thread which processes the packet according to IPv4 thus leaving only the packet processing thread which processes the packet according to IPv6 to continue running. However, in case the protocol field indicates the incoming packet is an IPv4 packet, the host processor may terminate the speculative packet processing thread which processes the packet according to IPv6 thus leaving only the packet processing thread which processes the packet according to IPv4 to keep running.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms incoming data packets, bus architecture, processor architecture, hardware delay mechanism, and hardware lookup mechanism are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of processing incoming packets prior to complete reception, comprising:
   receiving a pointer to at least one memory block allocated for storing at least one incoming packet to be written by at least one another controller, the at least one incoming packet comprises at least one packet segment;
   initializing at least one memory section in the at least one memory block mapped to at least one field contained in the at least one packet segment with at least one predefined data pattern which is different from a plurality of valid values of the at least one field;
   monitoring content of the at least one memory section;
   determining the at least one packet segment was written in the at least one memory block responsive to detecting the content of the at least one memory section does not match the at least one predefined data pattern; and
   processing the at least one packet according to at least part of the at least one packet segment.

2. The method of claim 1, further comprising:
   initiating, prior to the at least one packet segment written to the at least one memory block, a plurality of speculative execution threads each according to a respective one of the plurality of valid values of the at least one field,
   determining a value of the at least one field responsive to determining the at least one packet segment was written in the at least one memory block, and
   terminating each of the plurality of speculative execution threads which was initiated according to a respective value of the at least one field different from the determined value of the at least one field.

3. The method of claim 2, further comprising initiating at least one execution thread according to the determined value of the at least one field responsive to determining that none of the plurality of speculative execution threads was initiated according to the determined value of the at least one field.

4. The method of claim 1, wherein the at least one packet is processed according to a value of the at least one field.

5. The method of claim 1, wherein the at least one packet segment is written atomically in the at least one memory block, the at least one packet is processed according to a value of at least part of the at least one packet segment different from the at least one field.

6. The method of claim 1, wherein the at least one another controller is further adapted to insert at least one predefined value in the at least one field.

7. The method of claim 1, wherein the monitoring is periodic.

8. The method of claim 7, further comprising using a hardware delay mechanism adapted for periodically checking the content of the at least one memory section.

9. The method of claim 1, further comprising using a hardware lookup mechanism adapted for monitoring the at least one memory section and generating a notification upon change of the content of the at least one memory section.

10. The method of claim 1, wherein the at least one incoming packet comprises at least one of:
    a network packet received from at least one network controller,
    a shared memory packet received from at least one another processor,
    a data block loaded by at least one mass-storage device, and
    a data packet received from at least one media controller.

11. A system for processing incoming packets prior to complete reception, comprising:
    at least one processor executing a code, the code comprising:

program instructions to receive a pointer to at least one memory block allocated for storing at least one incoming packet to be written by at least one another controller, the at least one incoming packet comprises at least one packet segment;

program instructions to initialize at least one memory section in the at least one memory block mapped to at least one field contained in the at least one packet segment with at least one predefined data pattern which is different from a plurality of valid values of the at least one field;

program instructions to monitor content of the at least one memory section;

program instructions to determine the at least one packet segment was written in the at least one memory block responsive to detecting the content of the at least one memory section does not match the at least one predefined data pattern; and program instructions to process the at least one packet according to at least part of the at least one packet segment.

12. The system of claim 11, wherein the code further comprises:

program instructions to initiate, prior to the at least one packet segment written to the at least one memory block, a plurality of speculative execution threads each according to a respective one of the plurality of valid values of the at least one field, program instructions to read a value of the at least one field responsive to determining the at least one packet segment was written in the at least one memory block, and program instructions to terminate each of the plurality of speculative execution threads which was initiated according to a respective value of the at least one field different from the determined value of the at least one field.

13. The system of claim 12, wherein the code further comprises code instructions to initiate at least one execution thread according to the determined value of the at least one field responsive to determining that none of the plurality of speculative execution threads was initiated according to the determined value of the at least one field.

14. The system of claim 11, wherein the at least one packet is processed according to a value of the at least one field.

15. The system of claim 11, wherein the at least one packet segment is written atomically in the at least one memory block, the at least one packet is processed according to a value of at least part of the at least one packet segment different from the at least one field.

16. The system of claim 11, wherein the at least one another controller is further adapted to insert at least one valid predefined value in the at least one field.

17. The system of claim 11, wherein the monitoring is periodic.

18. The system of claim 17, further comprising using a hardware delay mechanism adapted for periodic check of the content of the at least one memory section.

19. The system of claim 11, further comprising using a hardware lookup mechanism adapted for monitoring the at least one memory section and generating a notification upon change of the content of the at least one memory section.

20. The system of claim 11, wherein the at least one incoming packet comprises at least one of:

a network packet received from at least one network controller, a shared memory packet received from at least one another processor, a data block loaded by at least one mass-storage device, and a data packet received from at least one media controller.

* * * * *